United States Patent [19]

Turpin et al.

[11] Patent Number: 4,742,097
[45] Date of Patent: May 3, 1988

[54] ACRYLIC AND ACRYLIC/EPOXY COPOLYMER COMPOSITION AS SELF-CURING CATHODIC ELECTROCOATING VEHICLES

[75] Inventors: Edward T. Turpin, Elyria; David T. Thrane, Fairview Park, both of Ohio

[73] Assignee: The Glidden Company, Cleveland, Ohio

[21] Appl. No.: 924,419

[22] Filed: Oct. 29, 1986

Related U.S. Application Data

[62] Division of Ser. No. 677,341, Dec. 3, 1984, Pat. No. 4,639,299.

[51] Int. Cl.$^4$ .............................................. C08F 283/10
[52] U.S. Cl. ...................................... 523/407; 523/411
[58] Field of Search ................ 523/407, 411, 415; 524/813

[56] References Cited

U.S. PATENT DOCUMENTS

| | | | |
|---|---|---|---|
| 4,031,050 | 6/1977 | Jerabek | 523/415 |
| 4,085,161 | 4/1978 | Sekmakas | 523/415 |
| 4,191,834 | 3/1980 | Tucker | 524/813 |
| 4,310,398 | 1/1982 | Gimpel | 524/813 |
| 4,514,552 | 4/1985 | Shay | 524/813 |
| 4,536,558 | 8/1985 | Kordomends | 523/415 |
| 4,568,710 | 2/1986 | Swider | 523/415 |
| 4,608,314 | 8/1986 | Turpin | 524/813 |

*Primary Examiner*—C. Warren Ivy
*Attorney, Agent, or Firm*—Thomas M. Schmitz

[57] ABSTRACT

Package and tank stable low temperature self-curing cation-active aqueous soluble or dispersible coating compositions are prepared by polymerizing blocked isocyanatoethyl methacrylate (IEM) alone or copolymerizing with various vinyl unsaturated monomers optionally in the presence of epoxy-amine adduct. These cation-active polymers when acidified or partially acidified provide aqueous solutions or dispersions especially useful as low temperature curable vehicles in cathodic electrocoating.

6 Claims, No Drawings

ACRYLIC AND ACRYLIC/EPOXY COPOLYMER COMPOSITION AS SELF-CURING CATHODIC ELECTROCOATING VEHICLES

This is a divisional application of Ser. No. 677,341 filed Dec. 3, 1984 now U.S. Pat. No. 4,639,299.

BACKGROUND OF THE INVENTION

The invention relates to improved self-curable cathodic electrocoating vehicles containing blocked isocyanate functionality together with other functionality i.e. OH, HN, etc., capable of producing a self-cure in an electrocoating system.

In U.S. Pat. Nos. 3,984,299 and 4,031,050 Jerabek teaches a method of electrocoating wherein the electrodepositable (cathode) composition comprises a blocked polyisocyanate and a hydroxyl-containing, adduct being the reaction product of a primary or secondary amine and a polyepoxide wherein the adduct is solubilized with acid to provide cationic groups. Hicks, U.S. Pat. No. 4,225,479 teaches aqueous resinous compositions salted with acid for electrodeposition wherein the composition is the reaction product of a polyepoxide and amine mixture of $C_{8-18}$ aliphatic monoamine and an aliphatic diamine containing one primary and one tertiary amine group reactive with epoxide groups. In U.S. Pat. No. 3,947,338, Jerabek and Marchetti teach cathodic electrocoating method using a self-curing polyurethane resin derived from the reaction product of an epoxide with a primry or secondary amine and a partially blocked organic polyisocyanate.

More recent systems relate to the copolymerization of various vinyl unsaturated monomers in the presence of epoxy resin adducts. Diefenbach et al, GB No. 3123536, teach an acidified aqueous binder for cathodic electrocoating wherein acrylic or methacrylic esters, hydroxy or amino substituted monomers and other nonfunctional vinyl monomers are copolymerized by emulsion polymerization in the presence of cationic synthetic resins such as adducts of epoxy resin with amines, poly caprolactone and diketimines. Subsequent mixing of a partially blocked diisocyanate further reacted with an alkane type polyol, i.e. trimethylol propane effects the crosslinking of the deposited coating. Gimpel et al, U.S. Pat. No. 4,399,256 have conducted polymerization with copolymerizable N-(1-alkenyl)isocyanate, particularly vinyl isocyanate.

It is further known to free radical polymerize isocyanoethyl methacrylate (IEM) in dry solvents with itself or with a variety of acrylic or styrenic monomers without substantial damage to the isocyanate functionality (see Paul E. Cranely, A Latent Crosslinker for Coatings and Adhesive Resins, 27th Annual Technical Conference of the Cleveland Society for Coating Technology, May 15, 1984). Regulski and Thomas (Organic Coatings Applied Polymer Science Proc., 48, pp 1006 (1983)) determined deblocking temperatures for various blocked isocyanatoethyl methacrylates polymerized in the presence of methyl methacrylate and ethyl acrylate. After reviewing the Gimpel patent these authors suggest that polymers containing blocked isocyanatomethacrylate monomers would be readily made for electrodeposition. Brixius and Simms, U.S. Pat. No. 4,446,175, teaches coatings based on IEM polymers and copolymers with various monomers using mercaptan chain-transfer agents. Bortnick (U.S. Pat. No. 2,718,516) had earlier described high molecular weight polymers based on (meth)acrylic ester isocyanates having a plurality of isocyanate groups. Oriel et al, U.S. Pat. No. 4,264,748 teach epoxy resin coating compositions cured with IEM/acrylate copolymers prepared from IEM or blocked IEM. Oriel and Flowers, U.S. Pat. No. 4,401,794 teach copolymerization of various acrylate and vinyl aromatic monomers with isocyanatoalkyl esters of unsaturated carboxylic acids (i.e. IEM) under anhydrous conditions to form moisture curable coatings.

Hazan, U.S. Pat. No. 4,167,499 teaches a graft copolymer comprising a monoepoxide portion said to be grafted onto a acrylicamine backbone having amine or hydroxyl functionality used in conjunction with conventional aminoplast crosslinkers. Sulling and Kuntz, U.S. Pat. No. 3,453,223, teach graft copolymerization of acrylonitrile, blocked polymerizable isocyanates under free radical catalysis in the presence of an aliphatically saturated alcohol having at least two primary or secondary hydroxyl groups. Schaefer (U.S. Pat. No. 4,429,096) teaches copolymers prepared from acrylamide and the quaternary salt of para-isopropenyl-$\alpha,\alpha$-dimethylbenzyl isocyanate with diethylaminoalkanols or alkamines.

A major shortcoming of existing commercial cathodic electrocoat resin systems is the high (350°–400° F.) baking temperature required to achieve adequate coating cure and resistance properties. Where a cure temperature of less than 350° F. is possible, there are usually problems such as lack of storage or tank stability.

The present invention relates to improved self-curing amino cation-active aqueous acid dispersible polymer coating compositions based on polymers and copolymers of unsaturated, polymerizable blocked isocyanate monomers, especially isocyanatoalkyl acrylates and methacrylates and their use in electrocoating.

SUMMARY OF THE INVENTION

The present invention relates to new package-stable and tank-stable self-curing cation-active aqueous dispersible coating compositions containing amino, hydroxyl and blocked isocyanate functionality. These are prepared by polymerizing or copolymerizing:

(a) at least 5 weight percent of a polymerizable blocked monoisocyanate having the formula:

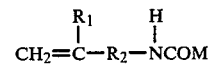

wherein $R_1$ is independently hydrogen or $C_{1-3}$ lower alkyl group; $R_2$ is a diradical

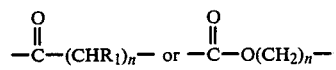

where n is 1 to 3; and M is an isocyanate blocking agent residue; said blocked monoisocyanate being polymerized alone or copolymerized with (b) 30 to 95 weight percent polymerizable comonomer comprising at least one member of the group consisting of acrylate and methacrylate esters, styrene, vinyl chloride, vinylidene chloride and vinyl acetate and wherein said acrylate or methacrylate esters are selected from alkyl, hydroxyalkyl, alkylaminoalkyl and dialkylaminoalkyl esters; wherein the weight percentage of (a) and (b) total 100; and wherein said polymerization is optionally carried out in the presence of (c) 60 to 300 weight percent of an amine-epoxy adduct comprising the reaction product of an epoxide and an organic amine having at least one primary or secondary amino group reactive with said epoxide; said percent (c) being based on total weight of (a) and (b) monomers;

said polymer or copolymer having an ionizable amino nitrogen, derived either from monomer (b), amino-epoxy adduct (c) or a combination thereof, sufficient to disperse or dissolve said polymer in an aqueous medium on acidification or partial acidification.

A further aspect relates to the use of new cationic-vehicles for coating various substrates, particularly useful in the cathodic electrocoating of metals and the resulting coated product.

DETAILED DESCRIPTION OF THE INVENTION

The instant amino cation-active aqueous cathodic electrocoatings are acidified or partially acidified compositions derived by polymerization of various vinyl monomers including amino and hydroxy containing monomers with various polymerizable organic monoisocyanates, optionally in the presence of various epoxy-amine adducts. The amino cation-activity of the instant polymer composition can be derived either from the vinyl monomer or from the epoxy-amine adducts which on acidification provide water soluble or dispersible compositions useful in the cathodic electrocoating of metals including aluminum, iron, and other substrates.

Useful polymerizable blocked monoisocyanates (a) include a variety of isocyanoalkyl acrylates and methacrylates having vinyl unsaturation capable of participating in free radical induced copolymerization with other vinyl monomers or oligomers. These include, for example, isocyanatoethyl methacrylate (IEM), isocyanatoethylacrylate, isocyanatopropyl acrylate, isocyanatopropyl methacrylate, isocyanatomethyl methacrylate and the like. The most preferred monomer is isocyanatoethyl methacrylate (IEM) wherein the isocyanate functionality is fully blocked with common blocking agents. In general the blocked isocyanate polymerizable monomer will have the structure

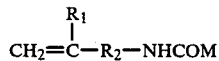

wherein $R_1$ is hydrogen or $C_{1-3}$ lower alkyl; $R_2$ is the difunctional radical

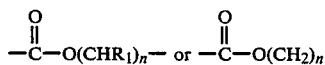

where n is 1 to 3; and M represents a blocking agent residue. Suitable blocking agents are those known in the art including alcohols, phenols, ketoximes, and the like. Especially preferred blocking agents are methylethyl ketoxime, caprolactam and 2-ethylhexyl alcohol or mixtures thereof. The general method of preparation is to add the isocyanate to the blocking agent with or without a catalyst, such as an organo-tin compound, over a period of time sufficient to control the exotherm, at a temperature high enough to achieve a reasonable blocking rate but low enough to prevent polymerization through the double bond or the reverse deblocking reaction. This temperature is normally 50°-120° C. depending on the particular isocyanate/blocking agent combination and the catalyst in use. Normally, a 0 to 10% excess of blocking agent is used; reaction is complete when free NCO content is essentially zero, as determined by either infra-red absorption spectroscopy or titration with standard n-butylamine solution.

The copolymerizable vinyl monomers (B) useful for copolymerization with the polymerizable blocked monoisocyanate (A) to form the acrylic or acrylic/epoxy nitrogen containing cationic resin include various monomers, such as styrene, vinyl toluene, (meth)acrylate esters, amino-bearing monomer such as dimethylaminoethyl (meth)-acrylate or hydroxyl-bearing monomer such as hydroxyethyl acrylate. Vinyl halides, vinyl acetate, and vinylidene halides are also useful copolymerization monomers. The copolymerizable vinyl monomers (B) are used in the instant invention in amounts of from 0 to about 95 weight percent basis total combined weight of A and B, preferably from about 30 to 95 percent and most advantageously from 45 to 60 weight percent. The vinyl monomer is copolymerizable with the blocked isocyanate monomer and the copolymerization can be done with or without the amine-adduct component (C).

The vinyl monomer (B) component usually comprises several different monomers which serve different purposes in the finished polymer. For example, the alkyl (meth)acrylate esters contribute to the polymer chain; the alkylaminoalkyl (meth)acrylate esters provide the amino functionality from which the amino cation-activity is derived by subsequent full or partial acidification. It is understood that similar cation-activity can be derived totally or in part by the epoxide/amine adduct (C) when the polymerization is conducted in the presence of (C) component. The hydroxyl-bearing vinyl monomer, i.e. hydroxyalkyl (meth)acrylates is useful in providing active hydrogen moiety, usually as a side chain off the main polymer chain, which contributes to the crosslinking activity for cure with the latent isocyanate groups. This functionality (OH) can be provided with (C) components

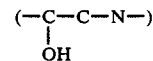

or alternatively the —OH functionality can be provided by glycol compounds added during the polymerization step or later. All three aspects and combinations are considered to be part of this invention. It will be appreciated that the amount of hydroxyl-bearing monomer depends in part on the reactive hydroxyl content of the epoxy resin. All of the hydroxyl-bearing functionality may be derived from either vinyl monomer or the aminated epoxy resin. When the hydroxyl functionality is derived from both monomer and aminated epoxy resin the content from each source may be varied widely.

Referring next to the amine-epoxy adduct (c), such adducts are well known in the coatings art. These products are formed by reacting an organic polyepoxide having epoxy equivalents greater than one and preferably about two, with an amine. The epoxides are exemplified in U.S. Pat. No. 4,294,741 column 3, line 26 through column 4, line 13. Useful amine-epoxy adducts are incorporated herein by reference to the following patents: U.S. Pat. No. 3,984,299 where such adduct, contrary to the instant invention is used as the dominant or only resin vehicle; U.S. Pat. No. 3,367,991; U.S. Pat. No. 3,321,548; U.S. Pat. No. 2,887,458; U.S. Pat. No. 4,066,525; and U.S. Pat. No. 4,119,599. Preferred amines useful in preparing the amine-epoxy adduct include amine having hydroxy functionality which can participate in the crosslinking reaction with the deblocked isocyanate functionality in the cure step. Such amines include the alkanolamines such as diethanolamine, ethanolamine, and in some cases triethanolamine. Such primary alcohols are quite reactive with isocyanates and contribute to the polymer crosslinkability more prominently than do the secondary alcoholic functionality produced in the formation of the amine adduct.

Although the amine epoxide adducts are preferred, other non-amine adducts can be used, as for example, when the amino cation portion is derived from the amino containing acrylates. Such compounds include polyepoxides reacted with polyhydric compounds, polycarboxylic acids and epoxides chain extended with polyols and cyclic polyols.

Aqueous coatings of the above type may be applied either by conventional coating techniques or by electrodeposition. For cathodic electrodeposition it is necessary to neutralize or partially neutralize the amine portion of the polymer. Thus by neutralizing the aminoresins desirable aqueous compositions can be obtained for electrodeposition from solutions or dispersions of pH between 3 and 10. This can be accomplished by acidification of all or part of the amino group functionality by an inorganic acid or an organic acid such as for example formic, acetic, or lactic acid and the like. In determining the degree of neutralization for a particular system, an amount of neutralizing acid is selected to solubilize or disperse the resin. Phosphoric acid is the preferred inorganic acid and lactic acid is a preferred organic acid for the acidification or partial acidification to form the amino cation active polymer compositions.

Usually the cathodic resin composition will be present in water at concentrations from about 1 percent to about 30 percent by weight of resin although more concentrated aqueous compositions may be prepared for storage and shipping. Preferred useful concentrations are from 5 to 15 weight percent. The unpigmented compositions may be electrocoated to deposit clear aqueous coatings on the cathode electrode. More commonly these compositions will be used in combination with various pigment compositions and other additives known to the electrocoating art. Conventional pigment containing compositions include organic and inorganic pigments and additives such as titanium dioxide, oxides, carbon black, talc, barium sulfate as well as pigments or pseudo pigments known as plastic pigments such as polystyrene particles and the like.

In the electrocoating process the aqueous cathodic bath containing the neutralized cationic resin, pigments, additives etc., is placed in contact with an electrically conductive anode and an electrically conductive cathode serving as the article to be coated. Current is applied (usually D.C.) at voltages between 50 and 500 volts whereby the organic resin migrates and is deposited on the metal substrate to be coated such as for example, steel, aluminum, iron and the like. Other bath components such as pigments, filler and additives are conveyed with the cathodically charged resin and deposited on the substrate. After deposition the coating substrate is removed from the bath and rinsed with deionized water prior to effecting a cure. The deposited coatings cure at elevated temperatures by the usual techniques of heating in ovens or with infrared heaters. While the prior art curing temperatures usually range from about 350° F. to about 425° F., an improved aspect of the instant invention allows cure temperatures in the range of from 300° F.–350° F. to provide metal coated products having excellent corrosion and detergent resistance.

Various other acrylic backbone or epoxy/acrylic backbone nitrogen-containing cation resins may be prepared by substituting different monomers or by modifying the type and amount of the epoxy/amine adducts present during the polymerization.

The following examples are meant to illustrate the invention without implying anylimitation therein. Unless otherwise defined parts and percentages are expressed as weight percentages and temperatures are given as degrees Centrigrade.

PREPARATION OF BLOCKED ISOCYANATES

EXAMPLE 1

Blocked Isocyanatoethyl Methacrylate 102.5 grams isocyanatomethacrylate (IEM) was added to 57.5 grams methyl ethyl ketoxime (MEKO) under agitation at 60° C. over a period of 1 hour, and then held for a further 30 minutes at which point free isocyanate content was reduced to essentially zero by infrared spectroscopy. The product (IA) was a liquid with a viscosity at 25° C. of 160 centipoise.

96.0 grams IEM was added to 77.0 grams (10% excess) caprolactam plus 0.17 grams dibutyltin dilaurate (DBTDL) under agitation at 75° C. over a period of 30 minutes, and held at 75° C. for a further 3 hours at which point the free NCO content had dropped to a trace by infrared spectroscopy. The product (IB) was a syrupy liquid.

EXAMPLE 2

Preparation of Aminated Epoxy Resin

| | Weight Parts |
|---|---|
| DER 333 (low mol. wt. epoxy resin from Dow Chemical Co., WPE = 200) | 1355 |
| Bisphenol A | 460 |
| Nonyl Phenol | 153.4 |
| Ethylene glycol mono-butyl ether (EGMBE) | 1013 |
| Di-ethanolamine | 219 |

DER 333, bisphenol A and nonyl phenol were charged into a 5 liter flask, and upheated slowly to 140° C., at which point the exothermic reaction (with cooling) carried the temperature to 170° C. The reaction was held at 170° C. to a constant viscosity as measured on the ICI cone and plate viscometer. The constants at this stage were: Viscosity at 125° C.=43.8 poise; WPE (wt. per epoxide equivalent)=940. The EGMBE solvent was added, the batch cooled to 120° C. and the diethanolamine added all at once, with cooling to hold 120° C. This reaction was given 2 hours at 120° C. and assumed complete. Final constants were:

| | |
|---|---|
| Non-volatile | 67.8% by wt. |
| Base number (NV) | 54 mg. KOH per gm. |

| | |
|---|---|
| Viscosity at 25° C. | 412 poise |

EXAMPLE 3

Epoxy-Acrylic Copolymer

This example is intended to demonstrate the advantage of polymerizing the acrylic portion in the presence of the epoxy component (copolymer method) rather than preparing the two components separately and then blended them (blend method).

| Copolymer | Grams |
|---|---|
| 1. Epoxy resin of Example 2 | 362 |
| 2. EGMBE | 53 |
| 3. IEM/MEKO of Example IA | 49.5 |
| 4. Dimethyl-amino ethyl methacrylate (DMAEMA) | 10 |
| 5. Styrene | 39.5 |
| 6. Vazo 64 | 6.5 |

Premixed items 3–6 were added to premixed items 1 and 2 at 85° C. under agitation over a period of 1 hour, followed by a hold period of 2 hours. The polymerization was considered essentially complete at this point as indicated by a determined non-volatile content of 65.5%.

EXAMPLE 4

Epoxy-Acrylic Blend

| Acrylic Resin | Grams |
|---|---|
| 1. IEM/MEKO | 49.5 |
| 2. DMAEMA | 10.0 |
| 3. Styrene | 39.5 |
| 4. Vazo 64 | 6.5 |
| 5. EGMBE | 52.8 |

Premixed items 1–4 were added to 5 under agitation at 85° C. over a period of 60 minutes, and held for a further 2 hours. Non-volatile content was 62.7%. Base number was 33.4 on non-volatile basis.

The above prepared acrylic resin (36.0 grams) was blended with 84.8 grams of the prepared aminated epoxy resin of Example 2 with simple mixing at 20° C. This blend was compared to the copolymerization product of Example 3. The improved properties of the reaction copolymer over those of the blend are shown in Table 1. The copolymer run gives a smooth glossy film whereas the blend film exhibits small craters.

TABLE 1

| | EXAMPLE 3 Copolymer | EXAMPLE 4 Blend |
|---|---|---|
| Viscosity[1] | 255 poise | 125 poise |
| Aq. viscosity break pt.[2] | 25% | 25% |
| 8% aqueous dispersion | Good Emulsion | Good emulsion, milkier than copolymer |
| Max. voltage Baked at 150° C./20 min. | 125 V | 125 V |
| Dry film thickness | 0.65 | 0.60 |
| Pencil hardness | 4 H | 4 H |
| Coating appearance[3] | Good smooth glossy film | Covered with small craters |
| MEK resistance (double rubs) | 140 | Unmeasurable |

[1] 60% solids in EGMBE, cone and plate viscometer at 25° C.
[2] Non-volatile level, neutralized with lactic acid, at which viscosity falls rapidly.
[3] Evidence that a beneficial interaction has taken place between the two components. Cure in both instances was at 150° C. for 20 minutes where electrodeposition was conducted at 100 volts for 2 minutes.

EXAMPLE 5

Zero-Hydroxyl Acrylic Resin/Amine Functional Monomer

This example serves to illustrate a special feature of the invention, namely that the blocked isocyanate does not need to be a separately prepared intermediate (its preparation may be integrated into a single process). When desired, the cocurable hydroxyl function may be supplied externally by a compatible polyol, blended in.

| Formula | Weight Parts |
|---|---|
| 1. IEM | 120 |
| 2. Caprolactam | 92.4 |
| 3. Dibutyl tin dilaurate | 0.2 |
| 4. Styrene | 390 |
| 5. Ethyl acrylate | 460 |
| 6. DMAEMA | 150 |
| 7. Vazo 64 | 35 |
| 8. EGMBE | 410 |

Item 1 was added under agitation to items 2 and 3 at 75° C. over a period of 30 minutes, followed by a 4 hour hold to get the free isocyanate content down to almost zero, as indicated by infrared scan. The blocked isocyanate was then diluted with the rest of the monomers, items 4 to 7. The combined monomer mix, 1 to 7 was then added to item 8 over a period of 2 hours at 85° C., followed by a 3 hour hold. The final determined (175° C.) non-volatile was 69.9%. Allowing for deblocking and loss of the caprolactam, true NV was calculated as 75.5%.

EXAMPLE 6

Epoxy-Acrylic Copolymer

| Formula | Weight Parts |
|---|---|
| 1. IEM/CPL adduct of Example 1 | 173.2 |
| 2. Styrene | 120 |
| 3. DMAEMA | 30 |
| 4. Vazo 64 | 18 |
| 5. Aminated Epoxy of Example 2 | 965 |
| 6. EGMBE | 175 |

Monomer premix (items 1 to 4) was added to 5 and 6 under agitation at 85° C. over a period of 1 hour, and then held for 2 hours. The final constants were:

| | |
|---|---|
| Non-volatile (determined) | 63.4% |
| Non-volatile (corrected) | 67.8% |
| Base No. (NV) | 46.3 mg. KOH per gm. |
| Viscosity (60%/EGMBE, 25° C.) | 168 poise |

EXAMPLE 7

Epoxy-Acrylic Copolymer in Absence of Amino Functional Monomer

| Formula | Weight Parts |
|---|---|
| 1. IEM/MEKO adduct of Example 1 | 150 |
| 2. Styrene | 150 |
| 3. Vazo 64 | 18 |
| 4. EGMBE | 175 |
| 5. Aminated Epoxy of Example 2 | 952 |

Monomer premix (items 1 to 4) was added to item 5 under agitation at 85° C. over a period of 1 hour, followed by a hold for 2 hours. Final constants were:

| Non-volatile (determined) | 61.5% |
|---|---|
| Non-volatile (corrected) | 65.2% |
| Base No. (on NV) | 34.4 mg. KOH per gm. |
| Viscosity (60% in EGMBE at 25° C.) | 135 poise |

When neutralized with lactic acid and diluted to 10% non-volatile in water, a smooth stable emulsion was produced.

EXAMPLE 8

Clear Prepared From Copolymer System

A clear electrocoating composition was formulated as follows:

| Formula | Weight Parts |
|---|---|
| 1. Resin of Example 6 | 455.8 |
| 2. 2-ethyl hexanol | 30.8 |
| 3. Lactic acid (88%) | 18.8 |
| 4. DI water | 900 |
| 5. DI water | 3028 |

Items 1 to 3 mixed and item 4 added. All added to item 5.

EXAMPLE 9

Grey Electrocoating Paint Composition

| | Weight Parts |
|---|---|
| Tank | |
| 1. Resin of Example 7 | 108 |
| 2. 2-ethyl hexanol | 7.0 |
| 3. PGMME | 7.0 |
| 4. Ethylene glycol mono-hexyl ether | 7.0 |
| 5. DI water | 7.0 |
| 6. Lactic acid (88%) | 3.4 |
| 7. DI water | 874 |
| Mix items 1 to 5 and add to items 6 and 7. | |
| Pigment Dispersion | |
| 8. Acrylic resin (a) | 12.02 |
| 9. Lactic acid (88%) | 1.31 |
| 10. DI water | 33.55 |
| 11. Clay | 4.11 |
| 12. Rutile titanium dioxide | 11.71 |
| 13. Carbon black | .051 |
| 14. Quinacridone pigment | .013 |
| 15. DI water | 4.22 |
| Added to tank. | |

(a) Copolymer IEM/MEKO/DMAEMA/Styrene/Ethyl acrylate at 63% in EGMBE.

Tank stability of Example 9

The material was subjected to a standard Teel pump test at ambient temperature for 4 weeks. To maintain deposited film smoothness and film build, a normal acceptable minor addition of ethylene glycol hexyl ether was made after 2 weeks. Quality was unchanged after the full 4 weeks.

| Oven Stability of Clear Feed | Weight Parts |
|---|---|
| Resin of Example 7 | 108 |
| 2-ethyl hexanol | 7 |
| PGMME | 7 |
| Lactic acid (88%) | 0.8 |

There was no perceptible change in viscosity after 1 month at 120° F. Note that, despite the excellent qualities of the Example 9 coating baked at 300° F. (Table 3), it also possesses good stability. Table 2 gives the application details and Table 3 the cured film properties of paint Examples 8 and 9.

TABLE 2

| | | Application Details(1) | | | |
|---|---|---|---|---|---|
| Paint | Resin | Type | Tank NV | DFT(2) | Voltage |
| Ex 8 | Ex 6 | Copolymer | 7.0 | 0.8 | 175–200 |
| Ex 9 | Ex 7 | Copolymer | 8.8 | 0.6 | 75–100 |

(1) Substrate - 24 gauge zinc-phosphated chromate-rinsed steel panels.
(2) Dry film thickness, in mils, after cure.

TABLE 3

| | | Cured Film Properties | | | |
|---|---|---|---|---|---|
| Paint | Resin | Bake Temp F | S/S(1) | Impact Dir. Rev. | Pencil Hardness | MEK Rubs(2) |
| Ex 8 | Ex 6 | 350 | 720 | 20 | 2 H | 25 |
| Ex 9 | Ex 7 | 300 | 768+ | 20 | H | 170 |
| | | 350 | 768+ | 20 | 2 H | 200+ |

(1) 5% salt-spray resistance, hours to failure.
(2) Methyl ethyl ketone soaked rag, number of double rubs to metal exposure.

What is claimed is:

1. An aqueous dispersed coating composition comprising an aqueous dispersed self-curing acid dispersed polymer composition containing amino, hydroxyl and blocked isocyanate functionality, the polymer composition comprising on a polymer solids weight basis (a) at least 5% copolymerized blocked monoisocyanate, (b) between 30% and 90% copolymerized vinyl comonomer based on (a) plus (b) totaling 100%, and (c) between 60% and 300% of an amino-epoxy adduct based on the weight of (a) plus (b), said polymer composition derived from the polymerization of:

at least 5 weight percent of the polymerizable blocked monoisocyanate (a) having the formula:

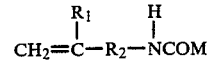

wherein $R_1$ is hydrogen or $C_{1-3}$ lower alkyl group; $R_2$ is diradical

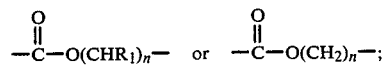

where n is 1 to 3; and M is an isocyanate blocking agent residue; said blocked monoisocyanate being copolymerized with 30 to 90 weight percent of the polymerizable vinyl comonomer (b) comprising at least one member of the group consisting of acrylate and methacrylate esters, styrene, vinyl chloride, vinylidene chloride and vinyl acetate and wherein said acrylate or methacrylate esters are selected from alkyl, hydroxyalkyl, alkylaminoalkyl and dialkylaminoalkyl esters, wherein the weight percentages are based on the combined weights of (a) and (b) monomers and total 100 percent, and wherein said polymerization is carried out in the presence of 60 to 300 weight percent of the amine-epoxy adduct (c) comprising the reaction product of an epoxide and an organic amine having at least one primary or secondary group reactive with said epoxide; and the weight percent (c) being based on total weights of polymerized monomers (a) and (b); and wherein the amine cation-activity is derived from monomer (b), or amine-epoxy adduct (c) or combinations thereof sufficient to provide an amino-cation activity of from 35 to 175 milliequivalents per 100 gram resin solids and to effect polymer solubilization or dispersion on partial or full acidification.

2. The composition of claim 1 wherein the monoisocyanate is isocyanatoethyl methacrylate and vinyl comonomer (b) is present at 40 to 85 weight percent.

3. The composition of claim 2 wherein amine-cation activity is derived from an ionizable amino-containing acrylic or methacrylic ester.

4. The composition of claim 3 wherein the amino-containing ester is dimethylaminoethyl methacrylate.

5. The composition of claim 2 wherein epoxy-amine adduct is the reaction product of a diglycidyl bisphenol A and a primary or secondary amine and has a molecular weight from about 600 to about 4000 and wherein said adduct supplies at least 10% of the amino-cation activity of the self-curable composition.

6. A paint comprising the composition of claim 2.

* * * * *